(12) United States Patent
Shimura et al.

(10) Patent No.: US 7,112,284 B2
(45) Date of Patent: Sep. 26, 2006

(54) OXYGEN SCAVENGER AND THE METHOD FOR OXYGEN REDUCTION TREATMENT

(75) Inventors: Yukimasa Shimura, Tokyo (JP); Junichi Takahashi, Tokyo (JP)

(73) Assignee: Kurita Water Industries LTD, Tokyo (JP)

( * ) Notice: Subject to any disclaimer, the term of this patent is extended or adjusted under 35 U.S.C. 154(b) by 0 days.

(21) Appl. No.: 11/044,292

(22) Filed: Jan. 28, 2005

(65) Prior Publication Data

US 2005/0156143 A1      Jul. 21, 2005

Related U.S. Application Data

(63) Continuation of application No. PCT/JP04/003701, filed on Mar. 18, 2004.

(30) Foreign Application Priority Data

Apr. 28, 2003    (JP) ............... 2003-123464

(51) Int. Cl.
C23F 11/12     (2006.01)
C23F 11/14     (2006.01)
C02F 1/70      (2006.01)

(52) U.S. Cl. ............ 210/750; 210/757; 252/188.28; 252/390; 252/392; 422/16

(58) Field of Classification Search ......... 210/750, 210/757; 252/178, 188.28, 392
See application file for complete search history.

(56) References Cited

U.S. PATENT DOCUMENTS

| | | | | |
|---|---|---|---|---|
| 4,067,690 A | * | 1/1978 | Cuisia et al. ............... | 422/16 |
| 5,256,311 A | * | 10/1993 | Rossi et al. ............... | 210/750 |
| 5,989,440 A | * | 11/1999 | Shimura et al. ........... | 210/750 |
| 6,346,206 B1 | * | 2/2002 | Shimura .................... | 252/390 |
| 6,540,923 B1 | * | 4/2003 | Koizumi et al. ........... | 210/750 |
| 6,669,853 B1 | * | 12/2003 | Charkhutian et al. ..... | 210/750 |
| 6,861,032 B1 | * | 3/2005 | Shimura et al. ........... | 422/16 |

FOREIGN PATENT DOCUMENTS

| | | |
|---|---|---|
| JP | 10-158872 | 6/1998 |
| JP | 10-251639 | 9/1998 |
| JP | 10-323561 | 12/1998 |
| JP | 11-123388 | 5/1999 |
| JP | 2002-129366 | 5/2002 |
| JP | 2002-146563 | 5/2002 |
| JP | 2002-146565 | 5/2002 |
| JP | 2002-146567 | 5/2002 |
| JP | 2003-73865 | 3/2003 |

* cited by examiner

*Primary Examiner*—Peter A. Hruskoci
(74) *Attorney, Agent, or Firm*—Manabu Kanesaka

(57) ABSTRACT

Oxygen scavenger which can exhibit excellent oxygen reduction effect in a wide variety of conditions is provided as an alternative volatile oxygen scavenger to hydrazine. The oxygen scavenger contains a heterocyclic compound having N-substituted amino group such as 1-amino-4-methylpiperazine and a hydroxylamine compound such as N,N-diethylhydroxylamine. The oxygen scavenger may further contain a polyhydric phenol type catalyst such as pyrogallol. By adding the oxygen scavenger to feed water of a water system of a boiler, oxygen reduction treatment of the water system is carried out.

9 Claims, No Drawings

OXYGEN SCAVENGER AND THE METHOD FOR OXYGEN REDUCTION TREATMENT

RELATED APPLICATIONS

The present application is based on, and claims priority from, Japanese Application Number 2003-123464, filed Apr. 28, 2003, the disclosure of which is hereby incorporated by reference herein in its entirety.

CROSS REFERENCE TO RELATED APPLICATION

This is a continuation application of PCT/JP2004/003701 filed on Mar. 18, 2004.

FIELD OF THE INVENTION

The present invention relates to an oxygen scavenger for inhibiting the corrosion of water system of a boiler or a steam generating plant and to a method for oxygen reduction treatment using the oxygen scavenger.

BACKGROUND OF THE INVENTION

Dissolved oxygen in feed water of a boiler and a steam generator is a factor causing corrosion of a boiler body, a heat exchanger and an economizer arranged upstream of the boiler, and a steam and condensate return line. To inhibit the corrosion, it is necessary to give an oxygen reduction treatment for removing the dissolved oxygen in the water.

As oxygen reduction treatment technique, there are physical treatment technique and chemical treatment technique. Conventionally, the oxygen reduction is carried out by the chemical treatment technique alone or a combined treatment using both the physical treatment technique and the chemical treatment technique simultaneously. As for the physical treatment technique, deaeration treatment by a heat deaerator, a membrane deaerator, or the like has been widely employed. As for the chemical treatment technique, a method of adding an oxygen scavenger, such as hydrazine, sodium sulfite, or saccharide, such as glucose, has been widely employed. Sodium sulfite and saccharide are non-volatile compounds, and they concentrate as a solid content in the boiler water of a boiler and a steam generator and increase the electrical conductivity greatly. On the other hand, since hydrazine is a volatile compound and does not concentrate in the boiler water, hydrazine has been employed in order to keep the solid content concentration low.

Since a question that hydrazine may be harmful to the human body arose, carbohydrazide (JP 1511025), oxime compounds (JP 1449004), hydroxylamine compounds (JP S58-28349B), heterocyclic compound having N-substituted amino group (JP 3287243), have been proposed as alternative volatile oxygen scavengers to hydrazine in recent years.

Among the conventional alternative volatile oxygen scavengers to hydrazine as mentioned above, since carbohydrazide forms hydrazine at high temperature, it was not a fundamental solution of alternative to hydrazine.

The other alternative volatile oxygen scavengers to hydrazine have the following problems.

Though a typical example of oxime compounds is methyl ethyl ketoxime, this compound has a slow oxygen reduction rate and can absorb few amount of oxygen per unit weight so that this compound is required to be added in a large amount.

Though a typical example of hydroxylamine compounds is diethylhydroxylamine, this compound has a slow oxygen reduction rate and can absorb few amount of oxygen per unit weight so that this compound is required to be added in a large amount.

Though typical examples of heterocyclic compound having N-substituted amino group include 1-aminopyrrolidine and 1-amino-4-methylpiperazine, 1-aminopyrrolidine exhibits rather poor oxygen reduction effect under high pressure condition compared to that under low pressure condition, and 1-amino-4-methylpiperazine exhibit rather slow oxygen reduction rate under low temperature condition.

SUMMARY OF THE INVENTION

It is an object of the present invention to solve the above-mentioned conventional problems, to provide an oxygen scavenger which is highly safe and effective, and to provide a method for oxygen reduction treatment using this oxygen scavenger.

An oxygen scavenger of the present invention contains a heterocyclic compound having N-substituted amino group and a hydroxylamine compound. The oxygen scavenger of the present invention may further contain a polyhydric phenol type catalyst.

According to the method for oxygen reduction treatment of the present invention, the oxygen scavenger of the present invention is added in the water system.

Both the heterocyclic compound having N-substituted amino group (heterocyclic compound having at least one atom to which an amino group bonds thereto, hereinafter, referred to as "N-substituted amino heterocyclic compound") and the hydroxylamine compound inhibit the corrosion in a surface of metal by effectively reducing and removing dissolved oxygen in water in the system of a boiler or a steam generator because of their excellent reducing action. In addition, the corrosion is inhibited also by their reducing power.

In the present invention, excellent oxygen reduction effect is obtained in a wide variety of conditions from low pressure to high pressure and from low temperature to high temperature because of excellent synergistic effect obtained by the combination of an N-substituted amino heterocyclic compound and a hydroxylamine compound. Even with smaller adding amount of this oxygen scavenger, the oxygen scavenger can exhibit excellent effect over that of a conventional oxygen scavenger.

When the oxygen scavenger further contains the polyhydric phenol type catalyst, the oxygen reduction effect in a low temperature water system is further improved.

PREFERRED EMBODIMENTS OF THE INVENTION

Hereinafter, preferred embodiments of an oxygen scavenger of the present invention and a method for oxygen reduction treatment will be described in detail. An N-substituted amino heterocyclic compound is preferably any one of the following i) to v), especially preferably 1-amino-4-methylpiperazine, but not limited to the followings.

i) 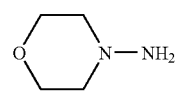

N-aminomorpholine ii) 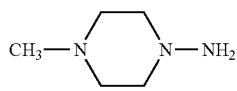

1-amino-4-methylpiperazine iii) 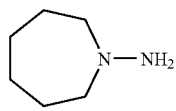

N-aminohexamethyleneimine iv) 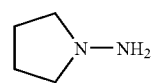

1-aminopyrrolidine v) 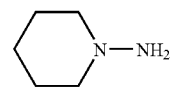

1-aminopiperidine

A Hydroxylamine compound used in the present invention may be a compound expressed by the following general formula. The hydroxylamine compound is preferably any one of a group consisting of hydroxylamine, N, N-diethylhydroxylamine, and N-isopropylhydroxylamine, especially preferably N,N-diethylhydroxylamine, but not limited thereto. The hydroxylamine compound may be a compound having a similar structure.

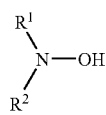

(wherein $R^1$ and $R^2$ can be the same or different from each other, and each represents a hydrogen atom or a lower alkyl group (for example, an alkyl group having 1 to 5 carbon atoms).)

As for each of the N-substituted amino heterocyclic compound and the hydroxylamine compound, one compound may be used alone or two or more compounds may be used simultaneously.

The quantity of the N-substituted amino heterocyclic compound and the quantity of the hydroxylamine compound are preferably decided according to the concentration of dissolved oxygen and the water quality of the water to be treated. Although the present invention is not limited to the following, the N-substituted amino heterocyclic compound and the hydroxylamine compound are each added to feed water of a water system by an amount of preferably from 0.001 to 1000 mg/L, particularly from 0.001 to 300 mg/L, especially from 0.001 to 100 mg/L. The weight ratio (a/b) of the adding amount (a) of N-substituted amino heterocyclic compound and the adding amount (b) of hydroxylamine compound is preferably from 0.01 to 100, especially from 0.1 to 10.

By adding a polyhydric phenol type catalyst as a catalytic compound in addition to the N-substituted amino heterocyclic compound and the hydroxylamine compound to the water system, the oxygen reduction effect can be improved especially when the temperature of the water system is low. The polyhydric phenol type catalyst is preferably hydroquinone, pyrogallol, methylhydroquinone, trimethylhydroquinone, t-buthylhydroquinone, or t-butylcatechol. Among these, pyrogallol is especially preferable. As the polyhydric phenol type catalyst, one compound may be added or two or more compounds may be added. The weight ratio (c/d) of the adding amount (c) of polyhydric phenol type catalyst and the sum (d) of the adding amount of N-substituted amino heterocyclic compound and the adding amount of hydroxylamine compound is preferably in a range from 0.005 to 0.2, especially from 0.0025 to 0.1. Therefore, as for the oxygen scavenger, the ratio C/D of the content (C) of polyhydric phenol type catalyst and the sum (D) of the content of N-substituted amino heterocyclic compound and the content of hydroxylamine compound is preferably from 0.005 to 0.2, more preferably from 0.0025 to 0.1.

According to the present invention, it is effective to appropriately use a neutral amine, a phosphate, an alkaline chemical and/or an anticorrosive agent which are normally used for boiler water treatment, if necessary, besides the aforementioned compounds. The neutral amine is not especially limited except that it is a volatile amine type compound. Examples of the neutral amine include cyclohexylamine, morpholine, monoethanolamine, monoisopropanolamine, diethylethanolamine, 2-amino-2-methyl-1-propanol, and ammonia. Examples of the phosphate include dibasic sodium phosphate, dibasic potassium phosphate, tribasic sodium phosphate, and tribasic potassium phosphate. Examples of the alkaline chemical include sodium hydroxide, potassium hydroxide, sodium carbonate, and potassium carbonate. Examples of the anticorrosive agent include hydroxycarboxylic acid (hydroxycarboxylate) compounds, such as gluconic acid (gluconate), succinic acid (succinate), and citric acid (citrate), and dicarboxylic acid (dicarboxylate) compounds. These compounds may also be used alone or in combination with one or more of the others. The adding amounts of these chemical agents are decided appropriately according to the water quality. For example, the adding amount of the neutral amine is preferably in a range from 0.001 to 100 mg/L relative to feed water, and the adding amount of the phosphate is preferably in a range from 0.01 to 100 mg/L to boiler water.

The oxygen scavenger of the present invention is preferably added to the feed water of the water system. However, it may be added from other parts to the water system. The N-substituted amino heterocyclic compound, the hydroxylamine compound, and other chemical agents as mentioned above may be mixed before addition, or may be added separately at a same feeding point, or may be added separately at respective different feeding points.

EXAMPLES

Hereinafter, the present invention will be described more concretely with reference to Examples and Comparative examples.

Comparative Example 1

Ion exchange water saturated by oxygen in air at 60° C. was fed to a natural circulation test boiler of 5 L in capacity. Tribasic sodium phosphate was added to the feed water in an amount of 1 mg/L, while the boiler was operated at a boiler internal temperature of 290° C., a boiler internal pressure of 7.5 MPa, an evaporation rate of 9 L/h, and a blow rate of 1 L/h. Generated steam was condensed completely into condensed water of room temperature by a heat exchanger and the concentration of the dissolved oxygen in the condensed water was measured using a dissolved oxygen meter. The results are shown in Table 1.

Examples 1 Through 4, Comparative Examples 2 Through 9

Examples 1 through 4 and comparative Examples 2 through 9 were made in the same manner as Comparative Example 1 except that compounds listed in Table 1 were added to feed water to obtain additive concentrations shown in Table 1, respectively. Then, steam was generated under the same conditions as those of Comparative Example 1. The concentration of dissolved oxygen in the condensed water obtained from steam was measured. The results are shown in Table 1.

capacity. Tribasic sodium phosphate was added to this feed water in an amount of 1 mg/L while the boiler was operated at a boiler internal temperature of 212° C., a boiler internal pressure of 2.0 MPa, an evaporation rate of 9 L/h, and a blow rate of 1 L/h. Generated steam was condensed completely into condensed water of room temperature by the heat exchanger and the concentration of the dissolved oxygen in this condensed water was measured using a dissolved oxygen meter. The results are shown in Table 2.

Examples 5 Through 7, Comparative Examples 11 Through 14

Examples 5 through 7 and Comparative Examples 11 through 14 were made in the same manner as Comparative Example 10 except that compounds listed in Table 2 were added to feed water to obtain additive concentrations shown in Table 2, respectively. Then, steam was generated under

TABLE 1

| | | Added compound | | Concentration of dissolved oxygen in |
|---|---|---|---|---|
| | | Kind | Additive concentration (mg/L) | condensed water obtained from steam (mg/L) |
| Example | 1 | diethylhydroxylamine | 4 | 0.6 |
| | | 1-amino-4-methylpiperazine | 3 | |
| | 2 | diethylhydroxylamine | 8 | <0.1 |
| | | 1-amino-4-methylpiperazine | 6 | |
| | 3 | diethylhydroxylamine | 2 | <0.1 |
| | | 1-amino-4-methylpiperazine | 12 | |
| | 4 | diethylhydroxylamine | 6 | <0.1 |
| | | 1-aminopyrrolidine | 8 | |
| Comparative Example | 1 | none | — | 4.5 |
| | 2 | methyl ethyl ketoxime | 7 | 2.2 |
| | 3 | methyl ethyl ketoxime | 14 | 0.8 |
| | 4 | diethylhydroxylamine | 7 | 1.6 |
| | 5 | diethylhydroxylamine | 14 | 1.0 |
| | 6 | 1-amino-4-methylpiperazine | 7 | 1.1 |
| | 7 | 1-amino-4-methylpiperazine | 14 | <0.1 |
| | 8 | 1-aminopyrrolidine | 7 | 1.3 |
| | 9 | 1-aminopyrrolidine | 14 | 0.2 |

Comparative Example 10

Ion exchange water saturated by oxygen in air at 40° C. was fed to the natural circulation test boiler of 5 L in the same conditions as those of Comparative Example 10. The concentration of dissolved oxygen in the condensed water obtained from steam was measured. The results are shown in Table 2.

TABLE 2

| | | Added compound | | Concentration of dissolved oxygen in |
|---|---|---|---|---|
| | | Kind | Additive concentration (mg/L) | condensed water obtained from steam (mg/L) |
| Example | 5 | diethylhydroxylamine | 18 | <0.1 |
| | | 1-amino-4-methylpiperazine | 8 | |
| | 6 | diethylhydroxylamine | 6 | <0.1 |
| | | 1-amino-4-methylpiperazine | 20 | |
| | 7 | diethylhydroxylamine | 11 | <0.1 |
| | | 1-aminopyrrolidine | 15 | |

TABLE 2-continued

|  |  | Added compound | | Concentration of dissolved oxygen in |
|---|---|---|---|---|
|  |  | Kind | Additive concentration (mg/L) | condensed water obtained from steam (mg/L) |
| Comparative Example | 10 | none | — | 6.5 |
|  | 11 | methyl ethyl ketoxime | 26 | 4.8 |
|  | 12 | diethylhydroxylamine | 26 | 3.3 |
|  | 13 | 1-amino-4-methylpiperazine | 26 | 0.2 |
|  | 14 | 1-aminopyrrolidine | 26 | <0.1 |

Comparative Example 15

Ion exchange water saturated by oxygen in air at 40° C. was fed to the pressure vessel of 5 L incapacity. Tribasic sodium phosphate was added to this feed water in an amount of 2 mg/L while the pressure vessel was operated at an internal temperature of 133° C., an internal pressure of 0.3 MPa, an evaporation rate of 5 L/h, and a blow rate of 10 L/h. Blow water was cooled to room temperature by a heat exchanger, and the concentration of the dissolved oxygen in the water was measured using a dissolved oxygen meter. The results are shown in Table 3.

Examples 8 and 9, Comparative Examples 16 Through 21

Examples 8, 9 and Comparative Examples 16 through 21 were made in the same manner as Comparative Example 15 except that compounds listed in Table 3 were added to feed water to obtain additive concentrations shown in Table 3, respectively. Steam was generated in the same conditions, and the concentration of dissolved oxygen in the blow water was measured. The results are shown in Table 3.

Examples 10 Through 13

Monoisopropanolamine was added to ion exchange water of ordinary temperature (25° C.) and pH was adjusted to be 9.0. Then, the ion exchange water with the monoisopropanolamine was put into the vessel of 1 L in capacity and was stirred for 10 minutes while the vessel was dipped in a constant-temperature water bath of which temperature was set at 60° C. so as to obtain concentration of dissolved oxygen as atmospheric equilibrium concentration of 60° C. The electrode of the dissolved oxygen meter was dipped in the water and opening was sealed to prevent generation of gaseous phase.

Compounds listed in Table 4 were added to the water in the vessel to obtain additive concentrations shown in Table 4. The concentration of dissolved oxygen was measured immediately after addition (onset) and was measured also after an elapsed time of 10 minutes and after an elapsed time of 20 minutes, respectively. The results are shown in Table 4.

TABLE 3

|  |  | Added compound | | Concentration of |
|---|---|---|---|---|
|  |  | Kind | Additive concentration (mg/L) | dissolved oxygen in blow water (mg/L) |
| Example | 8 | diethylhydroxylamine | 9 | <0.025 |
|  |  | 1-amino-4-methylpiperazine | 13 |  |
|  | 9 | diethylhydroxylamine | 9 | <0.025 |
|  |  | 1-aminopyrrolidine | 13 |  |
| Comparative Example | 15 | none | — | 0.070 |
|  | 16 | diethylhydroxylamine | 9 | 0.060 |
|  | 17 | diethylhydroxylamine | 22 | 0.055 |
|  | 18 | 1-amino-4-methylpiperazine | 13 | 0.050 |
|  | 19 | 1-amino-4-methylpiperazine | 22 | 0.035 |
|  | 20 | 1-aminopyrrolidine | 13 | 0.040 |
|  | 21 | 1-aminopyrrolidine | 22 | <0.025 |

TABLE 4

| | | Added compound | | Concentration of dissolved oxygen in water (mg/L) | | |
|---|---|---|---|---|---|---|
| | | Kind | Additive concentration (mg/L) | Onset | After 10 min | After 20 min |
| Example | 10 | N,N-diethylhydroxylamine | 70 | 4.5 | 3.7 | 2.9 |
| | | 1-amino-4-methylpiperazine | 90 | | | |
| | 11 | N,N-diethylhydroxylamine | 70 | 4.5 | 3.7 | 2.9 |
| | | 1-aminopyrrolidine | 90 | | | |
| | 12 | N,N-diethylhydroxylamine | 70 | 4.5 | 0.9 | 0.5 |
| | | 1-amino-4-methylpiperazine | 90 | | | |
| | | pyrogallol | 2.4 | | | |
| | 13 | N,N-diethylhydroxylamine | 70 | 4.5 | 0.6 | 0.3 |
| | | 1-aminopyrrolidine | 90 | | | |
| | | pyrogallol | 2.4 | | | |

From the results mentioned above, it is found that the combination of an N-substituted amino heterocyclic compound and a hydroxylamine compound provides excellent synergistic effect and excellent oxygen reduction effect in a wide variety of conditions. Moreover, it is found that the oxygen reduction effect in a low temperature water system is improved by use of polyhydric phenol type catalyst in addition to the N-substituted amino heterocyclic compound and hydroxylamine.

As described above, according to the present invention, the corrosion in a high temperature water system such as a boiler and a steam generating plant can be inhibited effectively by use of an oxygen scavenger which is highly safe and exhibits superior oxygen reduction effect even in a small adding amount.

What is claimed is:

1. An oxygen scavenger consisting essentially of at least one heterocyclic compound having an N-substituted amino group selected from the group consisting of N-aminomorpholine, 1-amino-4-methylpiperazine, N-aminohexamethyleneimine, 1-aminopyrrolidine, and 1-aminopiperidine, at least one hydroxylamine compound including N, N-diethylhydroxylamine with a weight ratio (A/B) of a content of the heterocyclic compound (A) and a content of the hydroxylamine compound (B) being in a range of from 0.1 to 10.

2. An oxygen scavenger as claimed in claim 1, wherein the heterocyclic compound is 1-amino-4-methylpiperazine and the hydroxylamine compound is N, N-diethylhydroxylamine.

3. A method for oxygen reduction treatment to a water system by adding an oxygen scavenger to the water system, wherein the oxygen scavenger is an oxygen scavenger as claimed in claim 1.

4. A method for oxygen reduction treatment as claimed in claim 3, wherein the oxygen scavenger is added to feed water of the water system.

5. A method for oxygen reduction treatment as claimed in claim 4, wherein the oxygen scavenger is added to the feed water such that the concentration of the heterocyclic compound having the N-substituted amino group is from 0.001 to 100 mg/L and the concentration of the hydroxylamine compound is from 0.001 to 100 mg/L.

6. A method for oxygen reduction treatment as claimed in claim 3, wherein the water system is a boiler or a steam generating plant.

7. An oxygen scavenger consisting essentially of at least one heterocyclic compound having an N-substituted amino group selected from the group consisting of N-aminomorpholine, 1-amino-4-methylpiperazine, N-aminohexamethyleneimine, 1-aminopyrrolidine, and 1-aminopiperidine, and at least one hydroxylamine compound including N,N-diethylhydroxylamine and a polyhydric phenol catalyst.

8. An oxygen scavenger as claimed in claim 7, wherein a weight ratio (C/D) of a content of the polyhydric phenol catalyst (C) and a content of the heterocyclic compound and the hydroxylamine compound (D) is in a range of from 0.005 to 0.2.

9. A method for oxygen reduction treatment to a water system by adding an oxygen scavenger to the water system, wherein the oxygen scavenger is an oxygen scavenger as claimed in claim 7, and a weight ratio (c/d) of an adding amount of the polyhydric phenol catalyst (c) and a sum of an adding amount of the heterocyclic compound and an adding amount of the hydroxylamine compound (d) is in a range of from 0.005 to 0.2.

* * * * *